United States Patent [19]
Johnson et al.

[11] 4,204,742
[45] May 27, 1980

[54] FIBER-OPTIC CIRCUIT ELEMENT

[75] Inventors: Mark Johnson, Leonberg-Warmbronn; Reinhard Ulrich, Leonberg, both of Fed. Rep. of Germany

[73] Assignee: Max-Planck-Gesellschaft zur Förderung der Wissenschaften e. V., Fed. Rep. of Germany

[21] Appl. No.: 934,984

[22] Filed: Aug. 18, 1978

[30] Foreign Application Priority Data

Aug. 19, 1977 [DE] Fed. Rep. of Germany ....... 2737499

[51] Int. Cl.² .............................................. G02B 5/14
[52] U.S. Cl. ............................. 350/96.20; 350/96.29; 350/285
[58] Field of Search .................. 350/96.20, 96.29, 285, 350/295; 356/135

[56] References Cited

U.S. PATENT DOCUMENTS

3,279,309  10/1966  Goldberg .......................... 356/135
4,152,043   5/1979  Albanese ......................... 350/96.20

Primary Examiner—Stewart J. Levy
Attorney, Agent, or Firm—Craig & Antonelli

[57] ABSTRACT

A fiber-optic circuit element is provided of the type for coupling signal light from a first optical fiber to at least one second optical fiber wherein at least one of the optical fibers has a free end which is controllably movable to be in or out of alignment with the other fibers. Movement of the free end of the fiber is achieved by an expansion layer applied to the fiber and acting as a heatable bimetallic element. Heating of the expansion layer can be achieved by absorption of electromagnetic radiation, including an independent source of control light and/or a portion of the signal light itself. Electrical heating mechanisms can also be used. This circuit element can be advantageously used without limit in optical switches, astable multivibrators, bistable multivibrators, optical resonators, and environmental temperature and pressure detectors.

34 Claims, 13 Drawing Figures

FIBER-OPTIC CIRCUIT ELEMENT

The invention relates to a fiber-optic circuit element with at least one first optical fiber arranged in a defined position and with a second optical fiber clamped in position at a distance from its free end, the free end of this second fiber being movable at right angles to the longitudinal axis of the fixedly clamped fiber so as to be controllably located in a position providing a coupling between the two fibers, to permit light transmission, or to be controllably relocated out of this coupling position. More particularly, the present invention relates to an optical control of this movement.

A conventional fiber-optic circuit element has been contemplated from ELECTRONICS LETTERS, Vol. 12, No. 15, July 1976, pg. 388. A conventional circuit element has been constructed as a fiber-optic changeover switch with a movable input signal fiber and two output signal fibers, wherein, by a suitably controlled movement of the free end of the input signal fiber, the light transmitted therethrough can be selectively coupled with one or the other of the output signal fibers. The input signal fiber is fixedly clamped at one end of a small glass tube having a square inner cross section, and extends fro that point coaxially to the longitudinal axis of the glass tube. The two output signal fibers are fixedly clamped at the other end of the small glass tube and extend from that point somewhat obliquely with respect to the longitudinal axis, so that their free end sections are held with a certain pretensioning at mutually diametrically opposed corners of the square through channel of the glass tube, and extend from that point in parallel to the longitudinal axis of the through channel. The free end faces of the output signal fibers for the coupling-in process are disposed in a common plane extending at right angles to the longitudinal axis of the glass tube, and the axial spacing of the coupling-out end face of the input signal fiber from this plane is only a few micrometers. The length of the optical fibers measured between the respective clamping points and their free end faces is in the range of one centimeter. Approximately at the center between the clamping point and its end face, the input signal fiber is surrounded by a short nickel sleeve mounted on its outer surface. By the application of a magnetic field which is transversally inhomogeneous with respect to the longitudinal axis of the input signal fiber and effective approximately in the diagonal plane of the glass tube containing the longitudinal axes of the output signal fibers, the free end of the input signal fiber can be deflected to such an extent that it enters a position wherein it is aligned with one or the other of the output-signal fibers, and the light exiting from the input signal fiber can be coupled in with the respective output signal fiber.

One disadvantage of this magnetically controlled fiber-optic circuit element is the requirement to supply energy for the control magnet through electric lines. This eliminates an essential potential advantage of fiber-optic transmission elements, namely the high insensitivity to electrical interferences of any type, for example, in the proximity of electrically driven machinery, or during thunderstorms. To fully ensure electrical insensitivity, the control signal need be supplied to the switch without the use of electrically conductive connections, such as by optical means.

A possiblity for realizing an optically controlled switch has been contemplated in that the voltage output signal of a pyroelectric detector, which can be irradiated with control light, and which absorbs the control light, is utilized as the control signal for an electrooptical modulator. The latter rotates the plane of polarization of the polarized light used as the signal light in dependence on the voltage output signal of the pyroelectric detector. (Applied Physics Letters, Vol. 24, No. 2, January 1974). However, such a switch has a grave disadvantage in that it can only switch polarized light.

Further, although such a switch can effect the interuption or switch-over of a signal light beam to two output channels, it is incapable of switching over to more than two output channels. Since the electrooptical modulator is sensitive to electrical interference fields, sufficient electrical shielding must be provided, which in some cases makes the construction more complicated and increases space requirements for the system. Additionally, the manufacturing technology of electrooptical switches involves complicated techniques and great expense, and the arrangement of a switch in a light path determined by optical fibers raises a plurality of constructional problems. Therefore, such switches seem to be unsuitable, at least at the present time, for complex fiber-optic circuit arrangements.

It is an object of this invention to provide a fiberoptic circuit element for switching light from an input fiber to any of a plurality of output fibers, which element is capable of switching even unpolarized light, operates reliably without magnetic or electrical shielding devices, has mimimal space requirements, can be manufactured easily without elaborate operations, and thus less expensively, and also includes optical activation.

This object has been achieved, in accordance with the invention, by providing a movably constructed optical fiber with a heatable expansion layer between the free end of the fiber and the clamping point, which layer is arranged unilaterally with respect to the longitudinal axis of the optical fiber, extending in the longitudinal direction of the fiber, and is firmly attached to the fiber. The expansion layer has a coefficient of thermal expansion different to that of the optical fiber. It is especially advantageous if the expansion layer can be heated by the absorption of electromagnetic radiation, and if the expansion layer is provided with an absorption layer for increasing the absorption capacity for the radiation used for the heating step. The absorption layer can be applied to the expansion layer. In such case, the expansion layer can be controllably heated in a particularly simple manner; and the expansion layer is extensively insensitive to electric or magnetic interference fields. The radiation employed for control purposes can be of a very low power.

The terms "control radiation" or "control light" set forth hereinbelow are understood to include not only visible light but also ultraviolet, infrared, and longer-wave electromagnetic radiation including the microwave range, as long as adequate heating of an expansion layer is achieved.

The circuit element of this invention operates as follows.

The input signal fiber, provided with an expansion layer, is aligned with the output signal fiber and the expansion layer is not illuminated with the temperature being equal to ambient temperature so that light exiting from the end face of the input signal fiber is coupled into the output signal fiber. If the expansion layer is then irradiated, it is heated up as is the zone of the optical fiber carrying the expansion layer. Because of the different coefficients of thermal expansion of the expansion layer and of the optical fiber, the latter will bend in the zone of the expansion layer in the manner of a bimetallic strip with the free end of the fiber being deflected transversely from the longitudinal axis of the fiber. The fiber end moves away from the material having the higher coefficient of expansion, which is ordinarily the absorber. The power coupled from the movable input signal fiber to the output signal fiber is reduced until finally at a sufficient degree of deflection, pratically no light power is coupled to the output signal fiber. If the control light is switched off, the expansion layer and the input signal fiber are cooled and, after a time period dependent on the thermal and mechanical properties of the input signal fiber, the movable fiber returns to the initial position where the input light power is again fully coupled to the output signal fiber. The circuit element of this invention can also be constructed so that the light path between the input signal fiber and the output signal fiber is interrupted if the expansion layer has no control light impinging thereon, and coupling of the light power takes place whenever the absorption layer is irradiated with control light, and the input signal fiber is deflected. It has been found that the light power transmitted between the input signal fiber and the output signal fiber can be higher by many orders of magnitude than the control light power required for the switching operation. Therefore, the circuit element of this invention can be utilized as an amplifier or an optical relay.

Moreover, the circuit element of this invention, because of the construction and mode of operation, has at least the following advantages.

The actuation of the switching function by means of control light is completely insensitive to magnetic and/or electrical interference fields at the position of the circuit element. Thus, magnetic or electric shielding can be omitted. Moreover, the only requirement is that the control light illuminates only the respectively associated absorption layer of the circuit element, and this can be done much more simply than the requirement of shielding against stray electric or magnetic fields. Coherent or incoherent light can be utilized as the control light. The switching function is achieved independently of the quality of the signal light transmitted by the circuit element, which light can be polarized or unpolarized, coherent or incoherent, and can have any desired wavelength within the spectral range transmitted with optical fibers.

When the length l of the expansion layer measured in the axial direction is markedly smaller than the length L of the laterally deflectable section of the input signal fiber, the amplitude h of the deflection of the free end of the input signal fiber can be given, in a good approximation, by the following relationship:

$$h = \frac{2(\alpha_C - \alpha_F) l L / d_F}{1 + \gamma E_F d_F / E_C d_C} \cdot \delta \quad (1)$$

In equation (1), $\alpha_C$ and $\alpha_F$ represent the coefficients of thermal expansion of the expansion layer and of the input signal fiber; $d_C$ and $d_F$ represent the thickness and diameter of the expansion layer and of the optical fiber, respectively; $E_C$ and $E_F$ represent the modulii of elasticity of the expansion layer and the optical fiber; the magnitude $\gamma$ is a geometrical factor dependent on the cross section, ranging between 0.15 for a round fiber and about 0.25 for a flat fiber; and $\delta$ is the temperature change or increase of the expansion layer occurring with respect to the ambient temperature $T_o$ upon irradiation by the control light.

The deflection amplitude h depending on the absorbed control light power is thus essentially proportional to the difference of the coefficients of thermal expansion $(\alpha_C - \alpha_F)$; therefore, sensitivity of the circuit element of this invention is higher, the larger this difference. At the same time, it is necessary that the expansion layer adheres firmly to the optical fiber. Thus, it is especially advantageous to produce the expansion layer, according to a preferred embodiment of the invention, by means of sputtering onto the fiber a metallic layer having a high coefficient of thermal expansion.

Especially suitable materials for the sputtered layer are Al and Mn, which have a strong adherence to an optical fiber consisting of, for example, quartz clad with glass having a refractive index $n_M$ lower than the refractive index $n_K$ of the quartz core.

Rapid heating of the expansion layer with small control light power may advantageously be achieved by blackening the expansion layer on the side facing the impinging control light and/or arranging an additional absorption layer on the side facing the impinging control light.

It is especially advantageous to have the expansion layer begin in the immediate vicinity of the clamping point of the movable fiber and to extend approximately ⅛ to ¼ of the length L of the free section of the movable fiber, so that the bending action in the zone of the expansion layer is transmitted into a large deflection of the end face of the movable fiber at the output side.

For a high sensitivity of the circuit element of this invention, it is also advantageous to equalize the bending properties of the expansion layer and of the fiber in accordance with the following Equation (2), so that the denominator in Equation (1) does not become larger than 2.

$$\gamma \frac{E_F d_F}{E_C d_C} = 1 \quad (2)$$

This is the case, for example, when using Al as the expansion layer where the thickness $d_C$ of the expansion layer is between 1/6 and ¼ of the diameter $d_F$ of the movable optical fiber. The expansion layer must not be too thin; and when aluminum is used as the expansion layer on a quartz or glass fiber, $d_C$ should be approximately equal to $d_F$.

If the fiber-optic circuit element of this invention is dimensioned with the length L of the optical fiber between 0.2 and 2 cm, the diameter $d_F$ of the fiber between 10μ and 200μ and the length L of the expansion layer in the longitudinal direction of the fiber between 50μ and 2000μ, then a favorably high temperature sensitivity of the fiber movement is obtained of about 1 μ/° K, i.e. a temperature increase of several tens of degrees is required to deflect the fiber by the amount of its diameter. The control light power necessary for this purpose is of the order of microwatts. In view of the small control light power required, it is readily possible to utilize a light-emitting diode (LED) arranged in the immediate vicinity of the expansion layer as the control light source, so that the control light flux can be conveniently controlled electrically. Although an LED requires supply voltage lines, the electric wiring remains simple and the control is insensitive against electromagnetic interference fields.

In accordance with a preferred embodiment of the invention, a light source is remotely arranged to be the control light source with the light passing to the expansion layer through an optical fiber. This construction of the fiber-optic circuit element has the following essential advantages. The fiber-optic lead is insensitive to electromagnetic interference fields. If the control light fiber extends into the immediate vicintiy of the expansion layer or its absorption layer, then the problem of spreading the irradiation around the area of the expansion layer can be readily avoided, and the entire control light power can be transmitted practically without loss to the expansion layer. Even if a second, analogously constructed circuit element is arranged directly proximate to the thus-controlled circuit element, the expansion layer of one circuit element "seeing" the control light for the other circuit element can be readily avoided. It is also possible to select the cross section of the control light fiber in correspondence with the irradiated surface area of the expansion layer so that the entire expansion layer can then be optimally distributed over the entire irradiated surface of the expansion layer.

When the core of the optical fiber is surrounded by a jacket having a lower index of refraction, which jacket carries the expansion layer, the control light is supplied through a control signal fiber extending essentially transversally to the longitudinal axis of the optical fiber. The control signal fiber is clamped in position separately from the input signal fiber.

However, if, in accordance with one embodiment of this invention, a multiple—layer optical fiber is provided for supplying the control light in a cross-sectional zone or layer which is optically insulated from the cross-sectional zone or layer carrying signal light, and the expansion layer is applied to the external zone or layer which carries the control light, then the control light can be conducted through this cross-sectional zone. In this way, another fiber for carrying control light is eliminated, and an especially compact structure is obtained. It is also possible to utilize the differing light distributions of high and low modes in the fiber core in such an arrangment. The fiber can also be fashioned in a suitable way in a planar technique with a corresponding number of superimposed, planar layers. Another possibility is the use of a dual fiber, consisting of two fibers disposed in parallel side-by-side relationship, which are firmly joined mechanically, but which are optically insulated from each other, to serve as the input signal fiber. When one of the fibers conducts the signal light and is adjusted with respect to the output fiber, the other fiber of the dual fiber supplies the control light to the expansion layer.

Since the position or deflection of the movable fiber is also dependent on ambient temperature, the circuit elements may be sensitive to fluctuations in the ambient temperature T°. This sensitivity to ambient temperature changes can be easily eliminated by providing the optical fiber carrying the output signal light with an expansion layer being diposed on the same side as the expansion layer on the movable optical fiber, and having dimensions that enable the free end faces of the fibers to be mutually aligned, or maintain a definite lateral spacing between them, in identical temperature environments. Also, the movable input signal light fiber and the output signal light fiber can have identical mechanical structures in that the cross-section of the fibers is the same, the lengths from the clamping parts to the free end faces are the same, and the respective expansion layers are arranged and formed symmetrically with respect to the transverse plane of symmetry of the coupling gap. The circuit element responds only to temperature differences between the expansion layers of the input and/or output signal fibers. In such differentially operating circuit elements, either one or the other, or also both, absorption layers can be utilized for control purposes.

The fiber-optic circuit elements according to the present invention can be utilized for detecting the ambient temperature, unless they are provided with a second expansion layer compensating for the influence of the ambient temperature. By measuring the reduction or increase in light flux flowing through the circuit element, due to the change in ambient temperature, such changes in the ambient temperature can be continuously observed. Such a circuit element can also be operated as a threshold switch, where an alarm signal is triggered, for example, if the ambient temperature rises above a predetermined threshold value interrupting the light flux. Various other numerous possibilities of using the arrangement present of the present invention are directly apparent from the description.

It is possible with a small additional expenditure for constructional components and with a minimum of space to realize even more complex fiber-optic circuits. The function of such complex circuits, in a frequency range determined by their mechanical properties, is analogous to that of complex electronic circuits.

In a construction where at least two fixedly arranged output light signal fibers are disposed in the zone or area of the travel stroke of the free end of the movable optical fiber, it is possible to switch over an input signal path to several output signal paths. This arrangement can provide the longitudinal axis of the movable fiber in alignment with the longitudinal axis one output signal fiber at an initial position in the cold condition of the expansion layer.

When several output signal fibers are arranged in the zone of the stroke of movement of the movable fiber, it is advantageous for circuit element to provide a stop means defining the position of the output signal fiber or fibers and simultaneously guiding the free end of the movable fiber within its deflection stroke. This stop means can also be advantageously constructed so that it holds, at least in the end positions of the stroke of movement of the movable fiber, the latter in a maximally well aligned relationship with the output signal fiber associated therewith at that position or point, so that at these end positions optimum coupling of the signal light through the coupling gap is achieved.

A further construction according to the present invention resides in a first expansion layer at one jacket side of the movable fiber and a second expansion layer at the opposite jacket side, with the two expansion layers offset with respect to each other in the longitudinal direction and arranged in mutual opposition. This achieves that the fiber can be actuated independently from two sides. Such an arrangement of expansion layers is especially advantageous if the input signal fiber is located symmetrically with respect to two or more output signal fibers, so that the deflection stroke in either direction need not be too large. It is possible by irradiating one of the expansion layers to compensate a deflection produced by the irradiation of the other expansion layer.

If, in such a circuit element, two parallel fixedly arranged optical fibers are provided with the longitudinal axes of the movable fiber extending in its neutral or cold position of the expansion layer between the axes of two fixed fibers with one of the two expansion layers pointing toward one of the fixed fibers, then the circuit element exhibits the properties of an astable multivibrator, the switchover cycle time being essentially determined by the mechanical and thermal properties of the movable fiber. Branch couplings are provided in this connection to branch off a fraction of the signal light passing through the output fibers, and couple the same into feedback or return optical fibers leading back to one of the expansion layers. Such couplings can be realized with mirrors, partially transmissive mirrors, beam splitters, or the like, or they can themselves be fiber-optic elements.

If the longitudinal axis of the movable optical fiber extends, in an initial condition, between the axes of the firmly clamped output signal fibes, partially overlapping the cross sections of either output signal fiber, then the sweep oscillation is triggered from the noise. Initially, no definition is given as to which of the two possible signal paths will be opened first. However, where an optical fiber for control light is extended at least to one, and preferably to both expansion layers, then the possibility is provided in a simple way to regulate by light control a specific initial condition on a fiber-optic circuit element constructed in the aforementioned manner as an astable mulivibrator, and also to eliminate the parasitic oscillations in a defined end position of the movable fiber.

An astable multivibrator with a defined initial condition can be constructed with a single stationery or fixed fiber, aligned with the movable optical fiber in the cold condition of the expansion layer, being provided with a branch coupling from which a feedback or return fiber extends to the expansion layer. The expansion layer is arranged on the side of the movable fiber, which faces away from the second output light signal fiber. This element has a particularly simple structure since only one of the fixed fibers is provided with a branch coupling and only one feedback fiber is required.

A bistable multivibrator can be constructed by the branch couplings and/or feedback fibers extending to the expansion layer of the two expansion layers on the movable fiber which faces away from the fixed fiber with the respective branch coupling. Each of the expansion layers can be illuminated with control light independently of the light flux through the feedback fibers, wherein the intensity of the control light is higher than the intensity of the proportion of signal light flux flowing through the feedback fibers, and being coupled into the expansion layers. In this arrangement, the axis of the movable optical fiber extends in the neutral position in the center between the axes of the fixed optical fibers which are substantially parallel to each other. Thus, the bistable multivibrator is triggered by control light pulses of sufficient power which are conducted through control light fibers to the respective expansion layers of the input light fiber or fibers.

In this regard, two movable input signal fibers can be unilaterally clamped and controllably moved by heating their respective expansion layers. Input signal light flux may be coupled simultaneously into the two movable fibers, which are each in alignment with a respective one of the fixed fibers in the cold condition. The two fixed fibers conducting output signal light are each provided with one branch coupling and/or feedback fiber conducting a portion of the output signal light flux to the expansion layer of the movable input fiber associated with the other fixed fiber. Again, each of the respective expansion layers can be illuminated with control light independently of the feedback fibers.

Each of the arrangements of the circuit element according to the present invention having more than one output signal fiber may advantageously be constructed with the lateral separation of the axes of the fixed fibers being only slightly larger than the fiber diameter $d_F$. These axes extend in parallel to each other and lie in a common plane which is also the plane of movement of the movable fiber.

If, according to a preferred embodiment of the invention, the expansion layer is arranged directly on a section of the part of the movable fiber carrying the signal light, then the deflection of the fiber is affected by the signal light itself. Such an arrangement can be utilized as a safety switch which interrupts the signal light flux when the signal light is too high. It is understood that, if the expansion layer is irradiated with signal light, an optionally provided additional absorption layer, which improves the absorptive capacity, is suitably disposed between the part of the fiber carrying signal light and the expansion layer.

The unilaterally clamped, movable fibers of the various fiber-optic circuit elements in accordance with the present invention, exhibit natural resonant frequencies, because of the properties of the material from which they are made, and because of their geometric dimensions. These natural resonant frequencies can lie in the entire audio frequency range, and can be excited, for example, by periodically irradiating the expansion layer or layers of the movable fiber. Since the resonant properties of the fiber-optic circuit elements of the invention can be varied within wide limits by corresponding dimensioning, narrow-band, tuned filters can also be provided in the entire audio frequency range.

A fiber-optic circuit element effective as a self-starting optical oscillator can be further achieved in accordance with the present invention where the signal light is coupled through the fixed fiber into the free end faces of the movable fiber, if a sufficiently high light power is coupled into its fixed fiber.

Another arrangement of such a circuit element according to the present invention resides in that the movable section of the movable fiber and the end section of the fixed fiber opposite the free end of the movable fiber are arranged in a gas tight housing where the resonance band width can be taken as a measure of the pressure ambient in the environment of the fiber-optic circuit element. Accordingly, simple pressure gauges of great operating safety can be constructed and arranged at relatively inaccessible locations for measuring purposes of an apparatus. Optical resonators constructed in this manner can be readily manufactured with a Q quality of about 1,000. Since the resonant frequency of these resonators depends on the mass of the fiber, it is also possible by determining the resonant frequency, to measure mass or layer thicknesses of deposits on the optical fiber or layers sputtered thereon. With the above-mentioned quality Q, mass changes of $10^{-4}$ of the fiber mass can be detected from resultant changes in frequency, i.e. changes in the mass on the order of $10^{-10}$ g. or layer thicknesses on the order of several atomic layers on the fiber.

When an expansion layer may be heated electrically, the expansion layer per se can be utilized as a heating resistor.

An advantageous result for using a fiber-optic circuit element of the present invention arisies in measuring technology. Thus, a physical variable may be measured by an apparatus comprising a mechanical resonator whose resonant frequency is influenced by the physical variable to be measured and a fiber-optical element according to the present invention which measures the oscillatory frequency of the mechanical resonator. This fiber-optic circuit element is arranged so that the movable fiber is excited to the oscillatory frequency of the resonator, and a detector for measuring the modulatory frequency of the signal light is provided. The fiber-optic circuit element can be connected, on the one hand, to another mechanical resonator so that it oscillates at the frequency of the latter, or it can also be constructed as the resonator with a resonant frequency dependent on the variable to be measured.

When the ends of the movable optical fiber and fixed fiber, mutually separated by the coupling gap, are provided with a jacket layer of magnetizable material, and when a device is provided for generating a magnetic field effective in the zone of the fiber ends in the axial direction, the effective bending resistance of the movable optical fiber can be varied in a simple manner by magnetic means. This arrangement can serve as a measuring probe for the magnetic field strength component parallel to the fiber. By introducing such a probe into a coil, the strength of the current flowing in the coil can be measured by the change in resonant frequency of the fiber. If the measured variable can be transformed into a locality-dependent force effective in addition to the bending resistance of the fiber, so that the resonant frequency of the fiber becomes a measure for the applied force, then a digital measuring method may be provided, and stabilizing problems occuring in analogous measuring methods are avoided.

The resonant frequency of a fiber optic circuit element according to the present invention may be varied by an appropriately electrical voltage. Shell-type electrodes to which a DC voltage can be applied may be provided at the mutually opposed end sections of the movable optical fiber and fixed fiber to apply such a variable voltage. A further construction of this type may have the electrical leads to the shell-type electrodes of at least the movable optical fiber constituted by the expansion layer and/or absorption layer consisting of a conductive material which also bridges the distance between the expansion layer and the electrode.

These and other objects, features and advantages of the present invention may be seen by reference to the drawings which illustrate, for purpose of example only several embodiments of the present invention, wherein.

Figure 1:
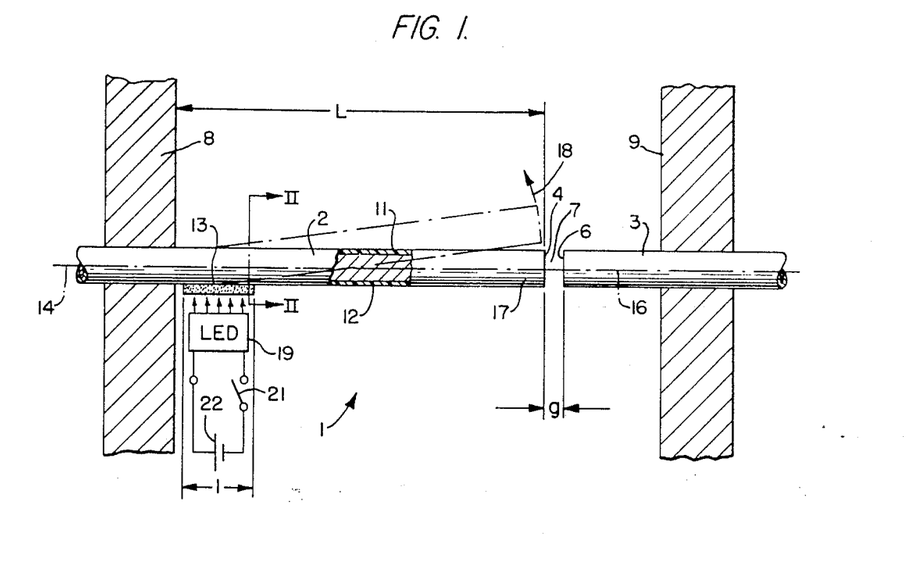
FIG. 1 shows a fiber-optic circuit element according to this invention with an input signal fiber being deflectable by illumination of an expansion layer.

A fiber-optic circuit element 1 illustrated in FIG. 1 comprises an optical input signal fiber 2, conducting coherent or in-coherent light, and an output signal fiber 3, the free end faces 4 and 6, respectively, of which are offset with respect to each other by a coupling gap 7 in the longitudinal direction of the two optical fibers 2 and 3. The input signal fiber 2 is fixedly clamped at a spacing L from its free end face 4 in a wall 8 of a housing not shown in detail. The fiber can, for example, be cemented into a bore of wall 8. Also the output signal fiber 3 is fixedly clamped into a wall 9 which can be of this same housing.

The input signal fiber 2 and the output signal fiber 3 comprise a core 11 having a relatively high index of refraction $n_K$ and a jacket or cladding 12 concentrically surrounding the core 11 with a lower index of refraction $n_M$. The input signal fiber 2 and the output signal fiber 3 have the same circular cross section with an outer diameter $d_F$. Typical values for the diameter $d_F$ are 10–150μ. The spacing L of the free end face 4 of the input signal fiber 2 from its clamping point in the wall 8 is about 0.2–2 cm. The gap width g between the end faces 4 and 6 of the two optical fibers 2 and 3 ranges in practical cases on the order of the fiber diameter $d_F$, but it is expedient especially with relatively large fiber thicknesses to choose the gap width g to be smaller in order to maximally suppress light loss in the zone or region of the coupling gap 7.

An expansion layer 13, which can be preferably heated by absorption of electromagnetic radiation, is applied unilaterally on the jacket or cladding 12 surrounding the quartz or glass core in the immediate vicinity of the wall 8 where the input signal fiber 2 is clamped. This expansion layer extends over an axial length l amounting to about 1/10 to ¼ of the length L of the free section of the input signal fiber 2. The expansion layer 13 is formed as a sputtered layer firmly adhering to the fiber jacket 12, and consists of a material, e.g. a metal, having a maximally high coefficient of thermal expansion. Especially suitable materials are Al and Mn, but almost all other metals as well as various glasses and ceramic materials are suitable for the expansion layer material. The important factor is that the expansion layers firmly adhere to the optical fiber and have a sufficiently high coefficient of thermal expansion or a coefficient of thermal expansion which differs sufficiently from the coefficient of thermal expansion of the fiber. Furthermore, the expansion layers should have a good absorptive capacity.

Figure 2:
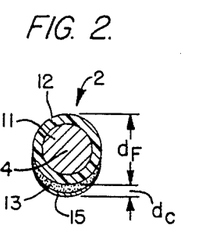
FIG. 2 shows the input signal fiber in a sectional view along line II—II of FIG. 1.
Figure 3A:
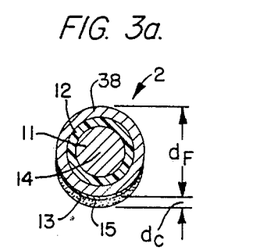
FIGS. 3a and 3b show sectional views corresponding to FIG. 2 of additional optical fibers provided with an expansion layer.

In the circuit element 1 of FIG. 1, the expansion layer is arranged on the underside of the input signal fiber 2, and encompasses almost 180° in a crescent-shaped cross section the lower cladding zone of the input signal fiber 2, which has a round cross-section, as can be seen from FIG. 2. In FIG. 3a an optical fiber of somewhat different construction also is encompassed crescent-like over 180° at one side. Accordingly, the region with the largest thickness $d_C$ of the expansion layer is located directly below the longitudinal axis 14 of the input signal fiber 2.

If the expansion layer 13 is illuminated from below with control light of a sufficiently high power, the layer is heated upon absorption of the control light to above the ambient temperature $T_o$, the fiber being deflected or bent in the manner of a bimetallic strip at the region of the expansion layer 13. To be able to utilize the control light power for heating the expansion layer 13 maximally quantitatively, a thin absorption layer 15 is also applied to the expansion layer; and this absorption layer has an especially high absorptive capacity for the control light employed. The absorption layer 15 is arranged in each case at that side of the expansion layer which the control light impinges. In the optical fiber illustrated in FIG. 2, this is the outside, whereas this is the inside of the expansion layer 13 in the optical fiber shown in FIG. 3a, facing the cladding layer 38 which conducts the control light. The expression "expansion layer" is to include in the following description in all cases that an additional absorption layer may be provided on the expansion layer.

As long as the expansion layer 13 is not irradiated with control light and the ambient temperature $T_o$ is within certain limits, the longitudinal axes 14 and 16 of the input signal fiber 2 and the output signal fiber 3, respectively, are in alignment, and signal light exiting at the free end face 4 of the input signal fiber 2 is coupled through the coupling gap 7 into the output signal fiber 3 with maximally low loss at the end face 6. If the expansion layer 13 is then irradiated with control light, and if the coefficient of thermal expansion of the expansion layer is higher than that of the input signal fiber 2, the free end section 17 of the latter is deflected upwardly in the direction of arrow 18. Thus, the exact alignment between the input signal fiber 2 and the output signal fiber 3 is disturbed and the light power coupled over in the zone of the coupling gap 7 is correspondingly diminished. If the control light is turned off, the input signal fiber 2 cools down and returns to its initial position after a period of time depending on the thermal and mechanical properties of the input signal fiber 2, so that the signal light flux is again coupled in its entirety.

While the light power which can be transmitted by the input signal fiber 2 and the output signal fiber 3 ranges at least around 10–100 mW, the control light power required in the circuit element 1 of FIG. 1 to deflect the free end 17 of the input signal fiber 2 by a deflection path h at least equal to the diameter $d_F$ of the output signal fiber 3, so that the signal light flux through the circuit element 1 is completely interrupted, amounts only to about 1–100 μW. Thus, it is possible to control by control light of very low power light flux having power higher by several orders of magnitude. During operation, it is therefore possible to attain a proportional light amplification by several orders of magnitude with a sufficiently gradually variable control light. The circuit element 1 can thus perform in fiber-optic control systems similar functions to that of transistors in electric control circuits.

Because of the small amount of control light power required, a luminescent diode or LED 19 can be used as the control light source, as illustrated schematically in FIG. 1. This light emitting diode is arranged in the immediate vicinity of the expansion layer 13, and light emission of such diode 19 can be controlled from a remote location conveniently by varying the operating voltage symbolically indicated in FIG. 1 by switch 21 connecting the diode 19 to a source 22 of supply voltage.

Figure 4:
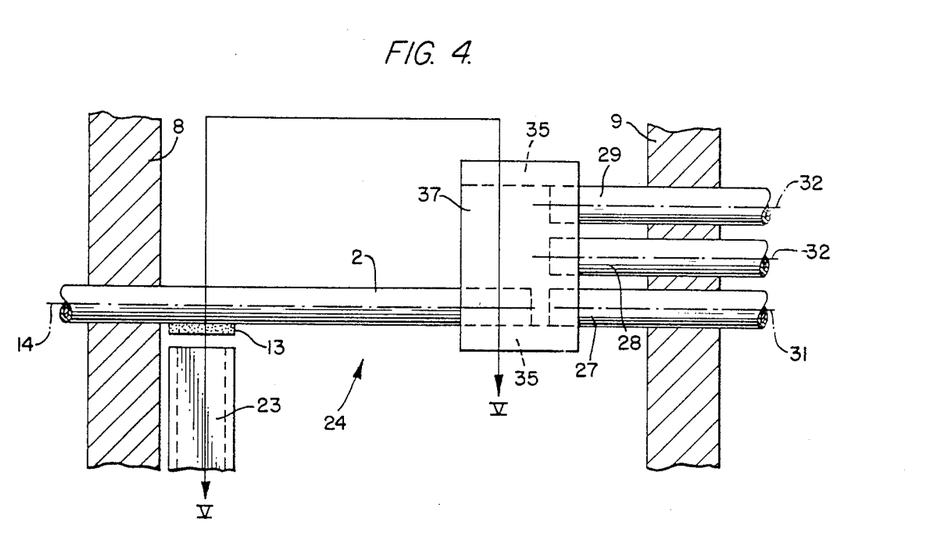
FIG. 4 shows a fiber-optic circuit element which can be used as a switching relay having a guide means for the movable optical fiber.
Figure 5:
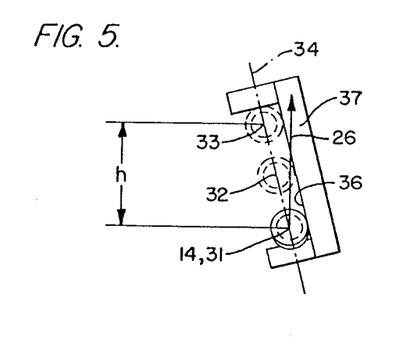
FIG. 5 shows the guide means of FIG. 4, partially in a sectional view along line V—V of FIG. 4.

As distinguished from the circuit 1 element 1 according to FIG. 1, the control light in the circuit element 24, according to FIG. 4, is conducted by a control light fiber 23 to the expansion layer 13. Larger amounts of control light power can be transmitted by the control light fiber 23, and also greater deflection travel strokes can be obtained for the free end 7 of the input signal fiber 2. The control signal fiber 23 has a cross section in the form of a flat rectangle corresponding to the area of the expansion layer 13, and is arranged so that almost the entire surface area of the expansion layer can be irradiated simultaneously without the radiation extending beyond or outside the expansion layer. When the expansion layer 13 is being irradiated, the input signal fiber 2 has a tendency to bend in the vertical plane as is marked by the arrow 26 in FIG. 5. Within the maximum deflection stroke h of the input signal fiber 2, three output signal fibers 27, 28 and 29 extending in parallel to one another can be provided where the vertical spacing between respectively adjacent longitudinal axes 31, 32 and 33 is only slightly larger than the diameter $d_F$ of the optical fibers used in this circuit element. As long as the expansion layer 13 of the input signal fiber 2 is not irradiated, its longitudinal axis is in exact alignement with the longitudinal axis 31 of the lowermost output signal fiber 27. The longitudinal axes 31, 32 and 33 are located in a common plane 24 indicated by dashed lines in FIG. 5. The direction of arrow 26 forms an acute angle of a few angular degrees with this plane, and marks the direction of the force which deflects the movable fiber 2 when the expansion layer 13 is heated. A plate-shaped abutment member 37 traversing the coupling gap 7 between the input signal fiber 2 and the output signal fibers 27, 28 and 29 defines the deflection path of the movable fiber 2 by a guide surface 36, and is further provided with upper and lower end stops 35 defining end positions of optimum coupling between the input signal fiber and at least the output signal fibers 27 and 29 disposed at the outside. With the circuit element according to FIG. 4, switching of the signal light to three output signal paths can be controlled. Depending on the size of the maximum deflection stroke h of the input signal fiber 2, still more output signal fibers and correspondingly more signal paths can be optionally provided.

In the fiber-optic circuit elements which have been described with reference to FIGS. 1, 2, 4, and 5, the signal and control light fluxes are completely separated from each other optically. However, if the input signal fiber has the structure indicated in cross section in FIG. 3a with an outer cladding 38 concentrically enclosing the jacket or cladding layer 12 of a low index of refraction, which surrounds the core 11, cladding 38 having a higher index of refraction and being provided on its outside unilaterally with the expansion layer 13, then the control light can also be supplied coaxially to the longitudinal axis 14 of the input signal fiber 2. The structure of a circuit element provided with this input signal fiber becomes considerably simpler since devices can be omitted which serve for mounting the optical fiber extending in the transverse direction. An optical fiber having the structure, according to FIG. 3a, is suitable, in particular, for a fiber-optic oscillator which will be described herein below.

Figure 3B:
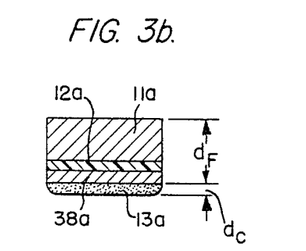

Alternatively, the coaxial arrangement can be provided as is illustrated in FIG. 3b where the optical fiber has a layered construction. In this embodiment, a rectangular fiber 11a corresponds to the core 11 of the round fibers in FIGS. 2 and 3a. The layer 12a of lower index of refraction corresponds to the jacket in these previous Figures; and this layer 12a optically insulates the fiber 11a carrying the signal light from the cross-sectional area of layer 38a carrying the control light. Layer 38a has a higher index of refraction. The light-absorbing material 13a with a higher coefficient of thermal expansion is employed as in the embodiments having a round fiber. The advantage of the rectangular arrangement, according to FIG. 3b, resides in that it can be manufactured very economically in planar construction by methods of micromanufacture (lithography, etching techniques).

Figure 6:
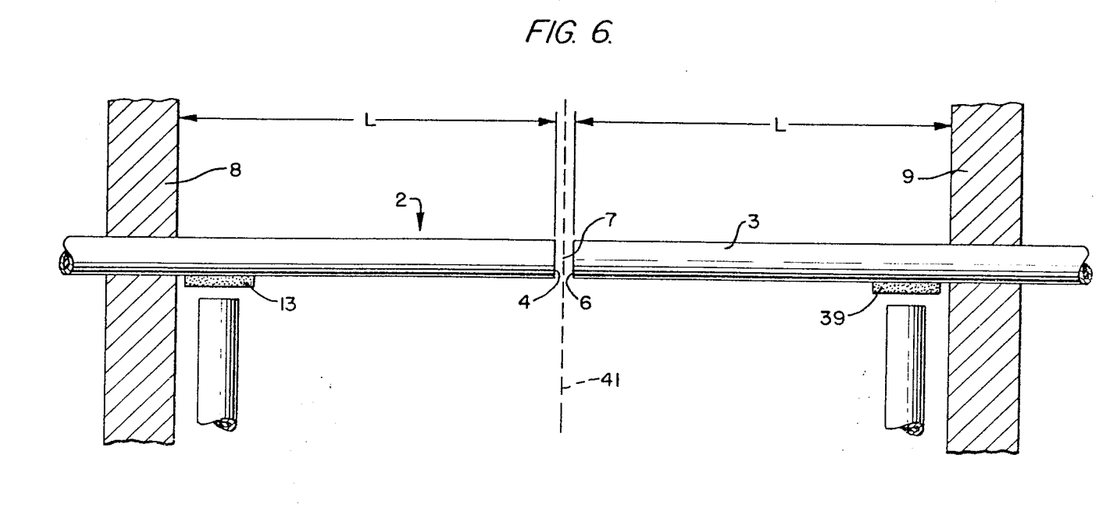
FIG. 6 shows an arrangement to compensate for influences of ambient temperature on the light flux through the optical fibers.

Because the deflection of the optical fiber 2 provided with the expansion layer 13 is always also dependent on the ambient temperature $T_o$, the previously described arrangements are sensitive to fluctuations in the ambient temperature. For this reason, they should be operated at a maximally constant ambient temperature. The disturbing influence of fluctuating ambient temperatures can, be mostly avoided in all of the embodiments of this invention by means of the structure explained with reference to FIG. 6.

If the fiber-optic part of the circuit element according to FIG. 1, for example, is constructed to be symmetric with respect to the plane of symmetry of the coupling gap 7, so that the unilaterally clamped sections of the input signal fiber 2 and of the output signal fiber 3, aligned with each other when the expansion layer 13 of the input signal fiber 2 is not under irradiation, have the same length L, and if the output signal fiber 3 is provided with an expansion layer 39 arranged on the same side as the expansion layer 13 of the input signal fiber 2, wherein the two expansion layers 13 and 39 are formed and placed symmetrically to the plane of symmetry 41 of the coupling gap 7, then the input signal fiber 2 and the output signal fiber 3 are deflected upon a change in the ambient temperature T by the same distance and in the same direction. Accordingly, the free end faces 4 and 6, respectively, remain in mutual opposition, unless one or the other expansion layer 13 or 39 is irradiated with control light. This circuit element according to FIG. 6 can be used as a differentially operating relay which is controlled by irradiating either one or the other of the expansion layer 13 and 39. It is, of course, also irrelevant in this case which of the two optical fibers 2 or 3 is utilized as the input or output signal fiber.

Figure 7:
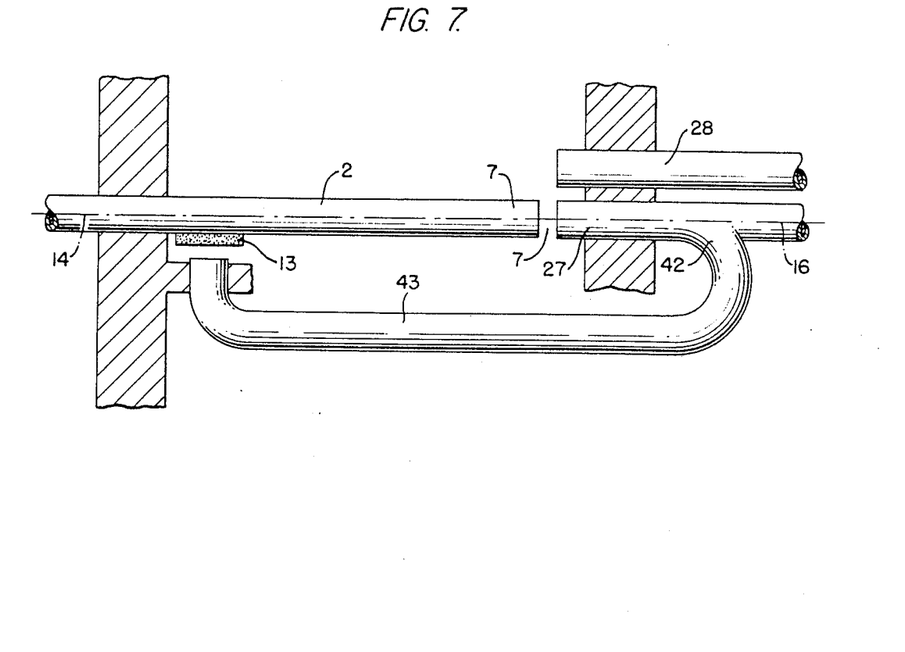
FIGS. 7 and 8 show embodiments of a circuit element according to the invention having the properties of an astable fiber-optic multivibrator.

The fiber-optic circuit element illustrated in FIG. 7 is similar in structure to the fiber-optic switching relay illustrated in FIG. 4, but in FIG. 7 only the two lower output signal fibers 27 and 28 are provided. The lower output signal fiber 27 has the longitudinal axis 16 in alignment with the longitudinal axis 14 of the input signal fiber 2, as long as the expansion layer 13 of the input signal fiber 2 is not illuminated; and the fiber 27 is equipped with a branch coupling 42 from which emanates an optical feedback fiber 43 to the expansion layer 13 of the input signal fiber 2. A fraction, on the order of 1-10%, of the signal light coupled from the input signal fiber 2 into the output signal fiber 27 can be decoupled through the branch coupling 42 for transmitting into the feedback fiber in order to illuminate the expansion layer 13.

This fiber-optic circuit element operates as follows. When the input signal fiber 2 is in its initial position shown in FIG. 7, in which its expansion layer 13 is "cold," the signal light is coupled into the lower output signal fiber 27. A portion of the signal light passes through the branch coupling 42 and the feedback fiber 43 back to the expansion layer 13 of the input signal fiber 2, and the free end section 17 of the fiber 2 is now deflected in the direction toward the upper output signal fiber 28. When the coupled light power heating the expansion layer 13 becomes sufficiently large, a switch-over of the signal light flux to the second output signal fiber 28 is achieved. The light flux through the lower output signal fiber 27 is then either interrupted or at least very greatly weakened so that the power of the control light impinging on the expansion layer 13 is correspondingly decreased. Therefore, the input signal fiber 2 is cooled, and straightens into alignment with lower fiber 27 until the power of the signal light flux, which is now again coupled in the largest part to the lower output signal fiber 27, and/or the power of the fedback portion of this signal light flux, is again sufficient to reheat the expansion layer 13, whereupon the above-described procedure is repeated. This circuit element thus has the properties of an astable multivibrator having a cycle time which is determined essentially by the mechanical and thermal properties of the input signal fiber 2.

Light modulated in phase opposition can be derived at the two output fibers 27 and 28, for exaple, for controlling other fiber-optic elements.

Figure 8:
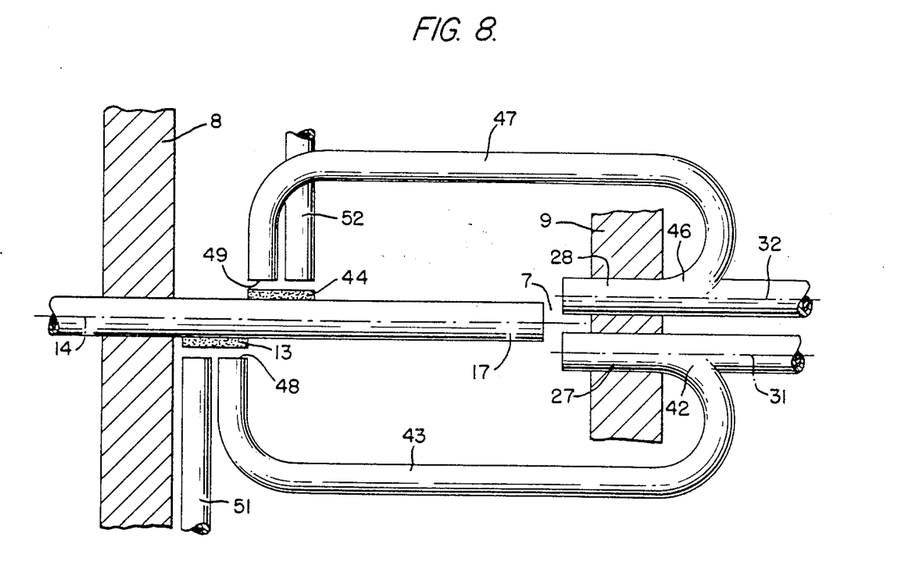

The fiber-optic circuit element shown in FIG. 8 likewise exhibits the characteristics of an astable multivibrator. The input signal fiber 2 is arranged in this case so that its longitudinal axis 14 in the undeflected condition extends between the longitudinal axes 31 and 32 of the two output signal fibers 27 and 28, and is parallel to these fibers. The two output signal fibers 27 and 28 are clamped in the wall section 9 in such close proximity to each other that cross sections, as seen in the direction of their longitudinal axes 31 and 32, overlap with the cross section of the input signal fiber 2, unless the free end section 17 of the latter is deflected in the direction toward one or the other of the output signal fibers 27 and 28, respectively.

The input signal fiber 2 in FIG. 8 is provided with two expansion layers 13 and 44, arranged on mutually opposite sides of the input signal fiber 2, wherein the lower expansion layer 13 of these layers is disposed on the side facing toward the extension of the longitudinal axis 31 of the lower output signal fiber 27, and the other, upper expansion layer 44 is disposed on the side of the input signal fiber 2 facing toward the extension of the longitudinal axis 32 of the upper output signal fiber 28. The two expansion layers 13 and 44 have the same effective length l. The lower expansion layer 13 is arranged in the immediate vicinity of the clamping point of the input signal fiber 2 in the wall section 8, whereas the upper expansion layer is offset at such a distance in the direction toward the free end 17 of the input signal fiber that the respective absorption areas are just out of overlapping relationship in the vertical direction. As is described above in connection with FIG. 7, each of the two output signal fibers 27 and 28 is provided with a branch coupling 42 and 46, respectively, from which emanate respectively feedback fibers 43 and 47, into which can be coupled respectively a fraction of the signal light. The lower expansion layer 13 facing the longitudinal axis 31 of the output signal fiber 27 can be illuminated by way of the feedback fiber 43 emanating from this lower output signal fiber 27. Correspondingly, the second expansion layer 44 can be illuminated by way of the second feedback fiber 47. The end faces 48 and 49 of the two feedback fibers 43 and 47 are arranged in the zones or regions of the expansions layers 13 and 44 which are proximate to each other as seen in the longitudinal direction of the input signal fiber 2, so that almost symmetrical relationships are provided with respect to the supply of the control light. If only the two feedback fibers 43 and 47 are provided as control light fibers for illuminating the two expansion layers 13 and 44, then, when signal light is fed into the input signal fiber 2, sweep oscillation of this circuit element will be triggered from the noise. However, if at the same time one of the two expansion layers 13 and 44, respectively, is irradiated with control light through another control light fiber, respectively 51 or 52, as shown in FIG. 8, then it is possible to keep one of the two signal light paths 2,27 or 2,28 transmissive, and to avoid parasitic oscillations.

Figure 9:
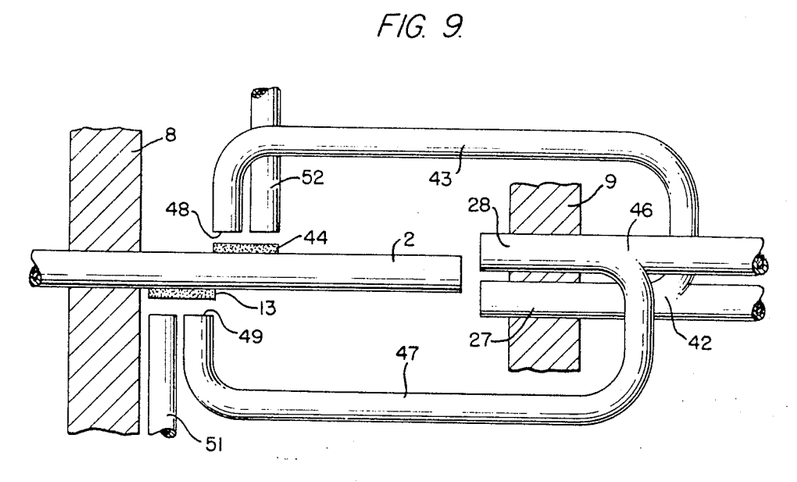
FIGS. 9 and 10 show embodiments of the circuit element of this invention having the properties of a bistable multivibrator.

The fiber optic circuit element shown in FIG. 9 differs in structure from that of FIG. 8 by the optical fibers 43 and 47 emanating from the branch couplings 42 and 46 being in each case extended to the other expansion layer 44 or 13, respectively. The branch fibers 43 and 47 thus do not have an oscillation-triggering effect but rather stabilize one or the other of the two possible positions of the movable fiber, and consequently, impart to the fiber-optic circuit element of FIG. 9 the characteristics of a bistable fiber-optic multivibrator which can be triggered by control light pulses of a suitable duration and intensity transmitted through the additional control fibers 51 and 52.

Figure 10:
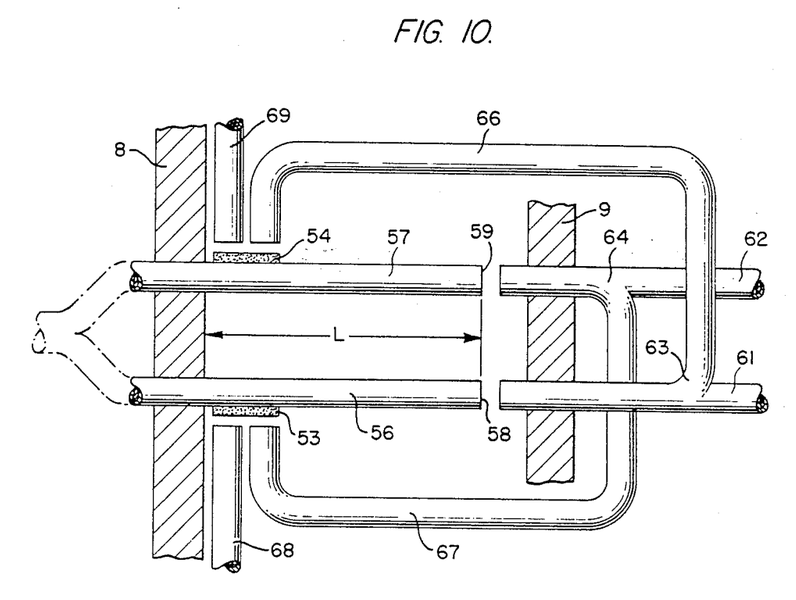

The fiber-optic circuit element shown in FIG. 10 also has the properties of a bistable multivibrator. In contrast to the circuit element according to FIG. 9, however, two input signal fibers 56, 57, each provided with expansion layers 53 and 54, are included and are fixedly clamped in housing wall 8 at the same spacing L from their free end faces 58 and 59. In the undeflected condition, the input signal fibers 56 and 57 extend parallel to each other and are aligned with mutually parallel output signal fibers 61 and 62 fixedly clamped in the housing wall section 9 at a spacing from each other amounting to a multiple of the fiber diameter $d_F$.

The two expansion layers 53 and 54 are arranged on the mutually opposed sides of the input signal fibers 56 and 57, but they could also be located on the mutually facing sides of the input signal fibers. Each of the two output signal fibers 61 and 62 is provided with a branch coupling 63 and 64, respectively, from which an optical fiber 66 and 67, respectively, leads to the expansion layer 54 or 53 of the input signal fiber 57 or 56, which is respectively associated with the other output signal fiber 62 or 61. The function of these optical fibers 66 and 67 is analogous to that of feedback fibers 43 and 47 of the circuit element shown in FIG. 9. Also the function of the additional control light fibers 68 and 69 corresponds to that of the control light fibers 51 and 52 according to FIG. 9. If the signal light fluxes transmitted to the input signal fibers 56 and 57 are identical, which would be the case when feeding them from a single source via a branch as indicated by broken lines in the left hand part of FIG. 10, then the properties of the circuit element according to FIG. 10 correspond largely to those of the element shown in FIG. 9. However, no distinction to FIG. 9, the Circuit element is made to conduct through two separate signal light paths 57,62 and 56,61 signal light fluxes of differing quality, i.e. different intensities and or wavelengths. This is advantageous for specific use.

In the circuit elements illustrated in FIGS. 7–10, optical fibers are employed having a jacket or cladding with an index of refraction $n_M$ which is lower as compared to the index of refraction $n_K$ of the core. Branch couplings which can be used in conjunction with the fiber-optic circuit elements according to FIGS. 7–10 have been previously contemplated by those skilled in the art, such as disclosed by H. H. Witte in "Optics Communications," 18:559 (1976).

Figure 11:
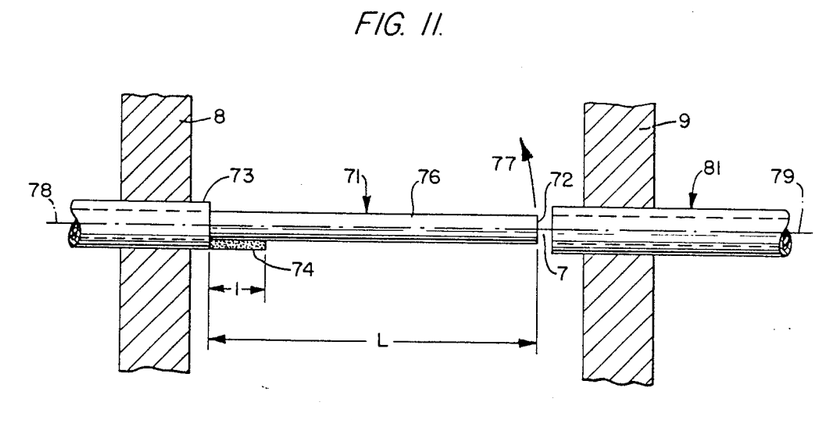
FIG. 11 shows a fiber-optic circuit element having the properties of a self-starting oscillator.

The fiber-optic circuit element shown in FIG. 11 has a similar structure as the fiber-optic relay according to FIG. 1, but is adapted to an entirely different utilization. The movable fiber 71 of this element unclad of the jacket 73 having a lower index of refraction along a section of the length L extending from the end face 72 to the immediate vicinity of the clamping point in the wall 8 of a housing. Also, the expansion layer 74 of this element which is arranged in the immediate proximity of the clamping point, just as in the fiber-optic relay or amplifier according to FIG. 1, is sputtered directly onto the unclad core 76 of a higher index of refraction $n_K$. This expansion layer has the length l which can be markedly smaller than the length L of the free core section 76. In this circuit element, a deflection of the optical fiber 71 in the direction of arrow 77 occurs if the optical fiber 71 carries a signal light which can now be absorbed directly by the expansion layer 74, since the latter is no longer optically insulated with respect to the core 76. In the "cold" condition of the expansion layer and correspondingly of the optical fiber 71, the longitudinal axis 78 is in alignment with the longitudinal axis 79 of an optical fiber 81 clamped in an opposite wall section 9 so that only a short section thereof projects toward fiber 71. The arrangement of this fiber corresponds to that of the output signal fiber according to FIG. 1. The optical fiber 81 can be readily clamped so that a long section thereof projects toward fiber 71, and it could also be provided with a compensating expansion layer as described in connection with FIG. 6.

If the optical fiber 71 provided with the expansion layer 74 is utilized as the input signal fiber, and signal light is periodically conducted thereto, then it oscillates at the modulating frequency of the signal light when this frequency is sufficiently low. If the modulating frequency of the signal light coincides with the mechanical, natural resonant frequency of the optical fiber 71, then a resonant amplitude is obtained which is higher by the Q quality factor of the (mechanical) fiber resonator than in the case of an excitation very different from the natural frequency of the optical fiber 71.

In an experimental element constructed according to FIG. 11, the diameter $d_F$ of the fiber core was about $20\mu$, the length of the uncovered core section 76 was 3.5 mm and the thickness $d_C$ of an expansion layer of aluminum extending over the entire length L of the fiber core as $0.1\mu$. With a control power of 0.4 mW, the resonant frequency f of the optical fiber 71 was 828.5 Hz, and the bandwidth was 0.9 Hz. With a control power of 4 MW, these values were 824.7 Hz. and 1.6 Hz, respectively. These changes can be explained by the higher average temperature of the fiber at the higher control power, because in this case the modulus of elasticity of the fiber is reduced and losses are increased. The Q quality factor was accordingly about 900, if the circuit element was disposed in a vacuum. With a control power of 90 μW, an oscillation amplitude was obtained of 104μ. If thicker expansion layers are employed, the control power requirement is on the order of merely 1 μW. If a circuit element oscillating in this way is not under vacum, then the resonator quality Q is lower due to friction losses and under atmospheric pressure amounts to only about 60. The resonator quality and/or resonant amplitude is dependent on atmospheric pressure and it can be seen from this dependency that the circuit element of FIG. 11 can be utilized as a fiber-optic pressure gauge.

If signal light of a sufficiently high power is coupled through the other optical fiber 81 instead of through the movable optical fiber 71, then the circuit element of FIG. 11 becomes a self-starting optical oscillator where the oscillation begins spontaneously, and where the maximum amplitude attainable is determined by the magnitude of light power supplied and by the amplification and loss characteristics of the fibers. In the circuit element having the above-indicated dimensions, the threshold power when supplying the light through the "fixed" optical fiber 81 was 0.4 mW.

Figure 12:
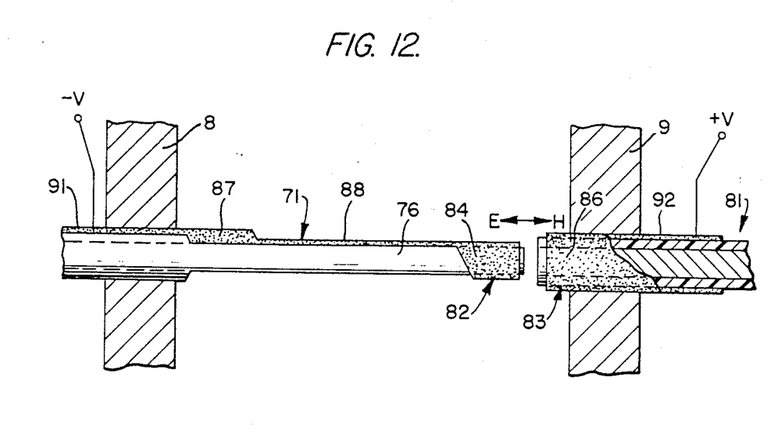
FIG. 12 shows a further embodiment of a fiber-optic circuit element according to this invention having resonant properties controllable by electrical or magnetic means.

In a circuit element according to FIG. 12, which corresponds in construction most extensively to the circuit element according to FIG. 11, the mutually opposed end sections 82 and 83 of the two optical fibers 71 and 81 are additionally surrounded by respective cylindrical shell-type electrodes 84 and 86 to which a DC voltage can be applied. The shell-type electrodes 84 and 86 are formed as thin metallic sputtered layers having a layer thickness of about 0.1μ. The expansion layer 87 sputtered onto the unclad core 76 of the movable optical fiber 71 has a considerably higher layer thickness (about 1μ) and consists of the same conductive material, preferably aluminum, as the shell-type electrode 84. A thin conductive bridge 88 having about the same thickness of material as the shell-type electrode, and being sputtered onto the same side of the unclad core 76 as the expansion layer 87, conductively connects the expansion layer 87 to the shell-type electrode 84. Zones or regions 91 and 92 extending into the outer region of the housing illustrated by wall sections 8 and 9, and relating to the sputtered layers constituting the expansion layer 87 of one optical fiber 71 and the shell-type electrode 86 of the other optical fiber 81, serve as connection terminals for applying an electric DC voltage (−V, +V). When a DC voltage is applied, the shell-type electrodes 84 and 86 are charged oppositely and attract each other because of the electric field strength oriented in parallel to the arrow E in FIG. 12. Thus, an increase in the effective rigidity of the movable optical fiber is attained, and the resonant frequency of this optical fiber can be varied by varying the voltage. If the fiber-optic circuit element is used in a self-oscillating operation, then conversely the modulating frequency of the signal light at the output of the movable fiber is a measure for the voltage applied to the shell-type electrodes 84 and 86. This can be measured by measuring the resonant frequency. By dimensioning the circuit element approximately as indicated in connection with FIG. 11, and with a spacing between the shell-type electrodes 84 and 86 of about 100μ, the increase in resonant frequency per 20 volts of voltage applied is about 1 Hz. An appropriate dimensioning of the oscillating optical fiber 71, makes it possible to obtain considerably higher or lower values for the frequency change per voltage unit.

A similar increase in resonant frequency can also be accomplished by magnetic forces. For this purpose, the layer 84 and 86 of the fiber ends are made of a soft-magnetic material (for example permalloy). If a magnetic field is effetive in the direction illustrated by arrow H, then attraction exists between the magnetized materials 84 and 86, increasing the effective bending strength of the movable fiber 71. The resultant increase in frequency is a measure for the magnetic field strength applied.

It is understood that in all embodiments described herein the resonance properties of the circuit elements can also be utilized by a periodic supply of control light through the control light fibers.

Finally, it is also possible to heat the absorption layer directly by the passage of an electrical current, instead of by absorption of radiation. For this purpose, the absorption layer can be made of two metallic layers with an electrically insulating intermediate layer. The mode of operation and possibilities for using such a circuit element correspond extensively to those of the arrangement according to FIG. 1. However, a higher sensitivity is obtained since the electric power supplied serves in its entirety for heating the expansion layer and the fiber, whereas for example with the use of the LED the heating action is reduced by the degree of efficiency of the LED and possible radiation losses.

Since aluminum expansion layers sputtered onto a fiber length of 200 m. can be made to melt under vacuum with a light power absorbed of less than 0.5 mW, and even quartz fibers are melted in case of a light power of 3 mW, circuit elements provided with such expansion layers can also be utilized as optical fuses to protect a sensitive optical device connected thereafter from overload.

In particular the fiber-optic circuit elements operating according to the resonance properties have a space requirement which, as compared to correspondingly effective electromechanical relays, is smaller by several orders of magnitude and also a correspondingly lower weight, opening up a multitude of usage possibilities.

While we have shown and described several embodiments and modifications in accordance with the present invention, it is understood that the same is not limited thereto but is susceptable of numerous changes and modifications as apparent to a person skilled in the art, and we therefore do not wish to be limited to the details shown and described herein but intent to cover all such changes and modifications as are obvious to one of ordinary skill in the art.

What we claim is:

1. Fiber-optic circuit element comprising at least one first optical fiber arranged at a predetermined fixed location and a second optical fiber clamped at a position with a free end extending at a distance from said clamped position, said free end being movable in a direction at right angles to the longitudinal axis of the first optical fiber, and said free end being controllably positioned to achieve optical coupling between said first and second optical fibers enabling the passage of light therebetween, and being controllably removable from said coupling position, characterized in that said second movable optical fiber is provided with a heatable expansion layer, between said free end and said clamping position, said expansion layer being constructed to be arranged unilaterally with respect to said longitudinal axis of said second optical fiber, extend in the longitudinal direction of said second fiber, and firmly adhere to said second fiber and said expansion layer having a coefficient of thermal expansion which is different from the coefficient of thermal expansion of said second optical fiber.

2. Fiber-optic circuit element according to claim 1, characterized in that said expansion layer can be heated by absorption of electromagnetic radiation.

3. Fiber-optic circuit element according to claim 2, characterized in that said expansion layer is provided with an absorption layer for increasing absorptive capacity for radiation utilized for heating said expansion layer.

4. Fiber-optic circuit element according to claim 1,2 or 3, characterized in that said expansion layer is formed by a metallic sputtered layer having a coefficient of thermal expansion which is considerably higher than the coefficient of expansion of said second optical fiber.

5. Fiber-optic circuit element according to claim 4, characterized in that said sputtered layer consists of Al or Mn.

6. Fiber-optic circuit element according to claim 1,2 or 3, characterized in that said expansion layer extends from the immediate vicinity of said clamping position over approximately $\frac{1}{8}$ to $\frac{1}{4}$ of the length L of free section from said clamping position to said free end of said second movable optical fiber.

7. Fiber-optic circuit element according to claim 1,2 or 3, characterized in that the said circuit element satisfies the expression $\gamma E_F d_F / E_C d_C \approx 1$, wherein $\gamma$ is a dimensionless factor dependent on fiber geometry and has a value between 0.15 for a round fiber and about 0.25 for a flat fiber; $E_F$ and $E_C$ are moduli of elasticity of said second optical fiber and of said expansion layer; and $d_F$ and $d_C$ are the diameter and the largest layer thickness, respectively, of said expansion layer.

8. Fiber-optic circuit element according to claim 1,2 or 3, characterized in that the length L of said free section of the second optical fiber ranges between 0.2 cm. and 2 cm., the diameter $d_F$ of said second optical fiber ranges between $10\mu$ and $200\mu$, and the length l of said expansion layer measured in the longitudinal direction of said second optical fiber is between $50\mu$ and $2,000\mu$.

9. Fiber-optic circuit element according to claim 1,2 or 3, characterized in that a control light source is provided for heating said expansion layer.

10. Fiber-optic circuit element according to claim 9, characterized in that said control light source is a light-emitting diode arranged in the immediate vicinity of said expansion layer and/or said absorption layer.

11. Fiber-optic circuit element according to claim 9, characterized in that said control light source is a remotely arranged light source and at least one further optical fiber passes light from said remotely arranged light source to said expansion layer and/or said absorption layer.

12. Fiber-optic circuit element according to claim 9, characterized in that said control light source includes one layer of said second optical fiber being a multiple-layer optical fiber, said multiple layer optical fiber having an outer cross-sectional zone conducting control light, said control light conducting zone being optically insulated from a cross-sectional zone conducting signal light through said first and second optical fibers.

13. Fiber-optic circuit element according to claim 1,2 or 3, characterized in that said first optical fiber conducts an output light signal and is clamped at a distance from the free end face thereof, and is provided with a second expansion layer at the same side as said expansion layer on said second optical fiber, said second expansion layer being with an identical temperature environment for said two expansion layers the free end faces of said first and second fibers, separated from each other by a coupling gap are maintained in a mutually aligned arrangement, or a predetermined lateral spacing therebetween is maintained.

14. Fiber-optic circuit element according to claim 13, characterized in that said first and second optical fibers have an identical mechanical structure and cross section and lengths L measured between said clamping positions and said free end faces being the same; and said two expansion layers are arranged and formed symmetrically with respect to transverse plane of symmetry of said coupling gap.

15. Fiber-optic circuit element according to claim 1,2 or 3, characterized in that at least two of said first optical fibers are fixedly arranged as output signal fibers disposed in a zone of the deflection travel stroke of said free end of said second movable optical fiber.

16. Fiber-optic circuit element according to claim 15, characterized in that said longitudinal axis of said second movable optical fiber in the cold condition of said expansion layer is aligned with the longitudinal axis of the one of said two output signal fibers which lies at the initial zone of said travel stroke of said second movable optical fiber.

17. Fiber-optic circuit element according to claim 1,2 or 3, characterized in that a stop means is provided to define the position of said first output signal fiber or said two output signal fibers and provide guidance for the path of motion of said free end of the second movable optical fiber within said deflection stroke h.

18. Fiber-optic circuit element according to claim 1, 2 or 3, characterized in that said deflection travel stroke h of said second movable optical fiber is limited by a stop means defining a position of optimum coupling between said second input signal fiber and at least one first output signal fiber.

19. Fiber-optic circuit element according to claim 1, 2 or 3, characterized in that said second movable optical fiber has a first expansion layer on one cladding side and has a second expansion layer on an opposite cladding side, said second expansion layer being offset in the longitudinal direction of said second movable fiber to such an extent with respect to said first expansion layer that said first and second expansion layers do not overlap in the longitudinal direction of said second movable fiber.

20. Fiber-optic element according to claim 19, characterized in that said longitudinal axis of said second movable optical fiber extends in the neutral cold position between the parallel longitudinal axes of said two first fixed optical fibers, and respectively one of said first and second expansion layers faces toward one of said two fixed optical fibers; and in that said two fixed optical fibers are provided respectively with one branch coupling from which a feedback fiber leads to said one of said first and second expansion layers which is arranged on the cladding side of said second movable fiber respectively facing toward the particular fixed optical fiber.

21. Fiber-optic circuit element according to claim 20, characterized in that further optical fibers for providing control light is extended to at least one of said first and second expansion layers.

22. Fiber-optic circuit element according to claim 19, characterized in that said first fixed optical fiber which is aligned with said second movable optical fiber in the cold condition of said first expansion layer is provided with a branch coupling from which a feedback optical fiber extends to said first expansion layer arranged on the side of the longitudinal axis of said second movable fiber facing away from the other of said two first fixed fibers.

23. Fiber-optic circuit element according to claim 19, characterized in that said longitudinal axis of said second movable optical fiber extends in the neutral cold position to a central position between the parallel longitudinal axes of said two fixed first optical fibers; in that said two fixed first optical fibers are provided respectively with one branch coupling from which respectively one feedback fiber extends to said one of said first and second expansion layers arranged on the cladding side of said second movable fiber facing away from the corresponding fixed first optical fiber; and in that each of said two first and second expansion layers can be illuminated with control light independently of the feedback light flux through said feedback fibers, said control light having an intensity which is higher than the intensity of the proportion of the signal light flux flowing through the feedback fibers.

24. Fiber-optic circuit element according to claim 1, 2 or 3, characterized in that two of said second movable input signal fibers, which are unilaterally clamped and can be controllably moved by heating respective expansion layers are provided, into which can be simultaneously coupled an input signal light flux, said two second fibers, when the expansion layer is cold, being in alignment with corresponding first output signal fibers; in that said output signal fibers are provided with respectively one branch coupling from which emanates a feedback control light fiber conducting a portion of the output signal light as control light to said respective expansion layers of said second input signal fibers which is associated with the other of said two output signal fibers; and in that both expansion layers can be additionally illuminated with control light.

25. Fiber-optic circuit element according to claim 19, characterized in that the lateral distances between said longitudinal parallel axes of said first fixed fibers, which axes lie in a common plane being the plane of movement of said second movable fiber, are only slightly larger than the fiber diameter $d_F$.

26. Fiber-optic circuit element according to claim 1, 2 or 3, characterized in that said expansion layer is arranged directly on a portion of said second movable fiber carrying the signal light without optical insulation.

27. Fiber-optic circuit element according to claim 26, characterized in that the signal light can be coupled through said first fixed fiber and the corresponding free end face into said second movable fiber.

28. Fiber-optic element according to claim 1, 2 or 3, characterized in that said free movable section of the second optical fiber and the end section of said first fixed optical fiber lying in opposition to said free end are arranged in a gastight housing.

29. Fiber-optic circuit element according to claim 1, 2 or 3, characterized in that said expansion layer can be heated electrically.

30. Apparatus for measuring a physical variable comprising a mechanical resonator having a resonant frequency being influenced by said physical variable, and further comprising a device for measuring oscillatory frequency of said resonator, characterized in that said device for measuring the oscillarory frequency includes a fiber-optic circuit element according to claim 1, 2 or 3, said second movable fiber of said circuit element being excited to oscillations having the frequency of said resonator, and in that said device is provided with a means for measuring the modulating frequency of the signal light.

31. Apparatus according to claim 30, characterized in that said resonator is said second movable fiber of said fiber-optic circuit element.

32. Apparatus according to claim 31, characterized in that said second movable optical fiber and said first fixed fiber have free ends mutually separated by said coupling gap, and are provided with a jacket layer of a magnetizeable material; and in that means are provided for generating a magnetic field effective in the zone of the fiber ends in the axial direction.

33. Apparatus according to claim 31, characterized in that said second movable optical fiber and said first first fixed fiber are provided, at the mutually opposed free end sections defining said coupling gap, with shell-type electrodes to which a DC voltage can be applied.

34. Apparatus according to claim 33, characterized in that at least a portion of the electric leads to said shell-type electrode of said second movable fiber is constituted by said expansion layer and/or said absorption layer consisting of a conductive material.

* * * * *